3,511,910
ANIMAL FOOD PRODUCTS FOR REDUCING PLASMA CHOLESTEROL LEVELS
Frank E. Halleck, 16 Forest Hill Drive,
Madison, Conn. 06443
No Drawing. Continuation-in-part of application Ser. No. 449,581, Apr. 20, 1965. This application Apr. 8, 1966, Ser. No. 541,079
Int. Cl. A61k 27/00; A23l 1/30; C08b 19/00
U.S. Cl. 424—180                                    13 Claims

ABSTRACT OF THE DISCLOSURE

This invention relates to an animal food product containing a polysaccharide consisting essentially of a polymeric chain of D-glucopyranose units, which is effective in reducing plasma cholesterol levels.

---

This application is a continuation-in-part of a prior application entitled "Polysaccharides and Methods for Production Thereof" having Ser. No. 449,581, filed Apr. 20, 1965 which is a continuation-in-part of a previous application bearing the same title having Ser. No. 319,093, filed Oct. 24, 1963, now U.S. 3,301,848 of Jan. 31, 1967, which in turn is a continuation-in-part of an application having Ser No. 235,904, filed Oct. 30, 1962, bearing the same title. The first and last mentioned applications are now both abandoned.

The present invention relates to animal food products; particularly the present invention relates to animal food products containing polysaccharides which are useful in reducing the normal plasma cholesterol level.

It is an object of the present invention to provide an animal food product having beneficial dietary properties.

It is another object of the present invention to provide a method of inducing reduction in the cholesterol level in the plasma of animals.

It is another object of the present invention to provide an easy and effective method of inducing reduction in the plasma cholesterol level of animals.

According to the present invention, there is provided an animal food product, said animal food product containing a polysaccharide in an amount greater than incidental impurities (e.g., 0.05 weight percent of the dry weight of said food product), said polysaccharide consisting essentially of a polymeric chain of D-glucopyranose units, said D-glucopyranose units being contiguously attached to one another by a beta 1,3 linkage to form said polymeric chain, said polymeric chain having appendant D-glucopyranose groups, said groups being contiguously attached to the polymeric chain through a beta 1,6 linkage, said polysaccharide having a molecular weight in excess of 1,000 and no greater than a 3:1 ratio of D-glucopyranose units without appendant D-glucopyranose groups to D-glucopyranose units having appendant D-glucopyranose groups.

In a more limited aspect of the present invention there is provided a method for inducing a reduction of the plasma cholesterol level of an animal which comprises orally administering to said animal a polysaccharide in an amount and for a period of time sufficient to reduce said cholesterol level in the plasma of said animals, said polysaccharide consisting essentially of a polymeric chain of D-glucopyranose units, said D-glucopyranose units being contiguously attached to one another by a beta 1,3 linkage to form said polymeric chain, said polymeric chain having appendant D-glucopyranose groups, said groups being contiguously attached to the polymeric chain through a beta 1,6 linkage, said polysaccharide having a molecular weight in excess of 1,000 and no greater than a 3:1 ratio of D-glucopyranose units without appendant D-glucopyranose groups to D-glucopyranose units having appendant D-glucopyranose groups.

The polysaccharides applicable in the food products and for inducing reduction in the cholesterol level in animals are characterized by consisting essentially of a polymeric chain of D-glucopyranose units contiguously attached to one another by beta 1,3 linkages. These polysaccharides are further characterized as having appendant D-glucopyranose groups which are contiguously attached to the D-glucopyranose units via beta 1,6 linkages and as having a ratio of D-glucopyranose units which are free from appendant groups to those units having appendant groups of no greater than 3:1.[1] These polysaccharides are presently available as fermentation products obtained from cultures of microorganisms such as certain fungi. Illustrative polysaccharides and the method of preparing the polysaccharide are disclosed in the aforementioned copending application by Frank E. Halleck. Another polysaccharide is the polysaccharide product derived from the fermentation of *Plectania occidentalis* NRRL 3137, disclosed by L. N. Wallen, et al. in Applied Microbiology, 13, 272 (1965). Typical polysaccharides have a ratio ranging from no greater than 3:1 to about 1:3. Advantageously adaptable are those polysaccharides having a ratio ranging from about 5:2 to about 4:3. Preferably employed are those polysaccharides having a ratio ranging from about 2:1 to about 3:2.

Polysaccharides applicable herein are those which have a molecular weight in excess of 1,000. Greater dietary effectiveness, however, is achieved by employing polysaccharides which have an average molecular weight in excess of 19,000. Advantageously, the polysaccharides adaptable herein will have an average molecular weight in excess of 50,000 with those having a molecular weight of at least 100,000 providing exceptional cholesterol reduction results.

Surprisingly, it has been found that when the polysaccharide is present in the animal's diet in an effective amount, ranging from more than incidental impurities (0.05 weight percent of the total diet solids intake), a reduction of plasma cholesterol results. The amount of polysaccharide necessary to effect a substantial reduction in plasma cholesterol will depend largely upon the particular animal involved. A larger oral intake of polysaccharide, in general, will provide greater reduction in the amount of cholesterol contained in the animals' blood. Illustrative amounts of polysaccharide range from about 0.1 to about 10.0 percent by weight of the animals' solid dietary consumption with an amount ranging from about 0.5 to about 5 weight percent of the solid intake being usually sufficient to provide a substantial reduction in the plasma cholesterol level.

---

[1] Treatment of these polysaccharides with a beta 1,3 D-glucanase derived from the organism Basidiomycete No. 806. (Collection maintained by Microbiology Laboratory, Quartermaster Research and Engineering Center, Natick, Mass.) yields an ascertainable ratio of D-glucose and gentiobiose. The ratio thereof is indicative of the groups contained in the polysaccharide.

The polysaccharides adaptable herein may be provided to the normal diet in the solid or liquid form. In the solid form, the polysaccharide can be admixed with the animals' diet or merely administered to the animal in the pure form. Aqueous mediums containing the polysaccharide (e.g., beverages) is another convenient way of administering the polysaccharide. Since the higher molecular weight polysaccharide (e.g., 19,000 and greater) provides viscous solutions at elevated concentrations, the amount of polysaccharide employed therein will be less than 2 percent by weight and usually less than 1 percent by weight of the aqueous medium.

Polysaccharides, ranging from the whole fermentation product including the dried product thereof to dry refined polysaccharides, may be employed in the instant invention. When the fermentation product is employed, the ferment should be heated to a temperature and period of time sufficient to inactivate the enzymes and kill the fungi contained therein.

The phrase "a method for inducing a reduction in the plasma cholesterol level of an animal" refers to reduction of the plasma cholesterol level in comparison to that observed in individual animals or the average of a group of animals, consuming a control diet without added polysaccharide. As is well recognized in the art, factors such as age, environment, inheritance, diet, etc., provide variance in the plasma cholesterol level between individual animals of a species.

Illustrative animals include chickens, rabbits, dogs, rats, cats, monkeys, humans, beef and dairy cattle, sheep, horses, turkeys, hogs, goats, etc.

The following examples are illustrative of the invention:

EXAMPLE I

Preparation of the polysaccharide

| Culture medium | Percent by weight |
|---|---|
| Distilled water | 94.80 |
| Glucose | 4.50 |
| Corn steep solids | 0.25 |
| $NaNO_3$ | 0.20 |
| $K_2HPO_4$ | 0.10 |
| $MgSO_4 \cdot 7H_2O$ | 0.15 |

The pH of the resulting above medium was adjusted to 4.5 with hydrochloric acid and the medium then heated at 250° F. for 1 hour at 15 p.s.i. steam pressure. An inoculum of *Sclerotium rolfsii* Barnett, American Type Culture Collection No. 15206 was developed through 4 stages in the above medium, using shake flasks and a 10 liter mechanically agitated and aerated fermenter. 4.0 volume percent was used in each transfer with incubation at 30° C. for 3 days.

After the culture medium had cooled, 8.0 volume percent of the above inoculum was added to a fermenter vessel, containing 500 gallons of the above sterile medium, equipped with a variable speed agitator, a sterile air supply and temperature control. The medium was incubated for 60 hours at temperature of 28° C., an agitation rate of 96 r.p.m. and an aeration rate of 0.8 vol./vol. of medium per minute. The ferment was then heated to 100° C. for 15 minutes to inactivate the enzymes and kill the fungus and cooled to 23° C. The fermentation product contained about 4 weight percent solids, of which about 1.5 weight percent consisted of the polysaccharide.

The fermentation product was homogenized with a single-stage homogenizer (Model 35C 490—400 gallons per hour—manufactured by Creamery Package Div. of St. Regis) at a pressure of 2,500 p.s.i. and at a temperature of 23° C. The homogenized fermentation product was diluted with 3 parts by weight water, mixed with 0.09 part by weight diatomaceous earth and then filtered to separate the polysaccharide from the fungus. The polysaccharide was separated from the resultant filtrate by adding an equal volume of ethanol. Within 2 minutes, the polysaccharide rose to the surface as a fibrous mass which was removed by skimming. The fibrous polysaccharide was then washed twice with a water-ethanol solution (50:50) and dried in an oven at 50° C. Analysis of the product was as follows:

Chemical and physical results

Specific rotation—$[\infty]D+4.4°$ (1 N NaOH)
Products from acid hydrolysis—glucose
Mole percent formic acid derived from periodate oxidation—26.5
Hydrolysis product of periodate oxidized gum—glycerol
Average degree of polymerization—750 glucopyranose units
Average molecular weight—151,000
Enzymatic hydrolysis products by beta 1–3 glucanase—2:1 mole ratio
Glucose—gentiobiose Thus, the polysaccharide consisted essentially of a polymeric chain of D-glucopyranose units contiguously attached to one another by a beta 1,3 linkage, with about one-third of the D-glucopyranose units having appendant D-glucopyranose groups linked beta 1,6 to the polymeric chain.

Chick feeding test

The effect of various carbohydrates (including the polysaccharide prepared in accordance with Example I) on plasma cholesterol in chicks was examined, using the following high cholesterol diet:

| Ingredient: | Percent by weight |
|---|---|
| Dehydrated whole egg | 25 |
| Soybean oil meal | 25 |
| Dicalcium phosphate | 2 |
| Limestone with trace minerals | 1 |
| Sodium chloride | 0.5 |
| Vitamin mixture | 0.4 |
| Glucose monohydrate | 46.1 |

The diet contained 23.2 percent protein, 12.7 percent fat and 0.65 percent cholesterol.

The basal diet was supplemented with various carbohydrates at the expense of glucose as follows:

Carbohydrate supplement

Diet:
  Experiment 1, control
    A _____ 3 percent cellulose.
    B _____ 3 percent citrus pectin, N.F.
    C _____ 3 percent polysaccharide (Ex. I).
  Experiment 2, control
    D _____ 2 percent cellulose.
    E _____ 2 percent citrus pectin, N.F.
    F _____ 2 percent polysaccharide (Ex. I).

Ten male chicks per lot maintained in electrically heated battery broaders on raised wire floors were fed the above diets ad libitum. Blood was collected for plasma cholesterol determinations by heart puncture at 3 weeks.[2] During the fourth week, all excreta were collected for a 2-day period in Experiments A, B and C and for three, 2-day periods in Experiments D, E and F. The excreta were dried at 80° C. to constant weight; total lipids were determined gravimetrically after extraction with chloroform methanol (2:1), and cholesterol was determined on the lipid extract by the method of Zlatkis.[3] In experiments D, E and F, nitrogen in the dried excreta was determined using a semi-micro Kjeldahl method.

---

[2] H. Fisher et al., Proc. Soc. Exp. Biol. & Med. (1964), vol. 116, page 278.
[3] F. Zlatkis et al., J. Lab. Clin. Med. (1953), vol. 41, page 486.

Table I below sets forth the body weights, plasma cholesterol and analysis of the dried excreta of the growing chicks.

Crude protein (minimum)—24%
Crude fat (minimum)—8%
Crude fiber (maximum)—4.5%

TABLE I

| Experiment | Diet | Supplement | Mean body weight, grams [1] | Mean plasma cholesterol, mg./100 ml.[1] | Mean Composition of dried excreta, percent | | |
|---|---|---|---|---|---|---|---|
| | | | | | Lipids | Cholesterol | Protein (N x 6.25) |
| 1 | A | Cellulose, 3% (control) | 262±13 | 293±11 | 4.30 | .44 | |
| | B | Citrus pectin, N.F., 3% | 222±12 | 214±11 | 10.22 | .71 | |
| | C | Fermentation Polysaccharide, 3% | 198±11 | 178±21 | 9.46 | .74 | |
| 2 | D | Cellulose (control) | 289±10 | 267±9 | 5.85 | .57 | 50.2 |
| | E | Citrus pectin, N.F., 2% | 301±6 | 206±8 | 9.24 | 1.01 | 49.5 |
| | F | Fermentation polysaccharide, 2% | 242±10 | 183±9 | 8.99 | 1.10 | 48.1 |

[1] ± standard error of mean.

As shown in Table I, the feeding of the instant polysaccharide provided a plasma cholesterol reduction over that obtained either by the control diet (i.e., Diets A and D) or the pectin containing diets accompanied by marked increases in the level of excretion of cholesterol and lipids. While the chicks fed the polysaccharide in Diets C and D maintained excellent health; the weight gain was less than that of the control indicating effectiveness of the polysaccharide in weight control.

EXAMPLE II—MALE CHICKS

Employing the methodology of Example I, data relating to the mean body weight and mean plasma cholesterol level for 3 week old male chicks was obtained. Effectiveness of various levels of carbohydrates, including the polysaccharide prepared in accordance with Example I, was thus determined. Table II sets forth the particular carbohydrate employed and amounts thereof which replaced the glucose monohydrate disclosed in the basal diet of Example I.

TABLE II

| Diet | Supplement | Amount (percent by weight) | Mean body weight (grams) | Mean plasma cholesterol (mg./100 ml.) |
|---|---|---|---|---|
| G | Cellulose (control) | 3.0 | 139 | 267 |
| H | Pectin, N.F. | 3.0 | 110 | 258 |
| I | do | 2.0 | 139 | 206 |
| J | do | 1.5 | 116 | 241 |
| K | do | 1.0 | 139 | 252 |
| L | do | 0.5 | 135 | 235 |
| M | Polysaccharide | 3.0 | 117 | 157 |
| N | do | 2.0 | 117 | 183 |
| O | do | 1.5 | 137 | 220 |
| P | do | 1.0 | 130 | 201 |
| Q | do | 0.5 | 134 | 251 |

As indicated in Table II, the polysaccharide induced a substantial reduction in the plasma cholesterol level over that achieved by diets containing either the cellulose or pectin, N.F. Reduction of the mean body weight was also achieved by inclusion of the polysaccharide in the diet.

EXAMPLES III—DOGS

Sixteen beagle dogs were divided into 4 groups of 2 males and 2 females each. The dogs, 4 to 6 months of age, were immunized against distemper and hepatitis and were cleared of demonstrable helminths. The dogs were allotted to groups on an age and weight basis such that each group would be essentially equal with respect to initial weight and probable growth. Where litter mates were available, they were randomly distributed to different groups. Dogs were individually caged with feed and water available ad libitum. A commercial dry dog food constituted the basal ration.

The polysaccharide from Example I was incorporated into the basal diet as follows:

Diet R—no additive
Diet S—0.2% polysaccharide
Diet T—2.0% polysaccharide
Diet U—5.0% polysaccharide Blood cholesterol values [5] were determined at 30 and 90 days. Data in regard to mean weight gain and mean plasma cholesterol in mg./100 ml. is set forth in Table III.

TABLE III

| Diet | Polysaccharide (percent by weight) | Mean plasma cholesterol, mg./100 ml. | | | | Mean weight gain, 90 days, kg. | |
|---|---|---|---|---|---|---|---|
| | | 30 days | | 90 days | | | |
| | | Male | Female | Male | Female | Male | Female |
| R | 0.0 | 155 | 156 | 234 | 173 | 3.9 | 3.7 |
| S | 0.2 | 120 | 139 | 147 | 149 | 3.1 | 2.3 |
| T | 2.0 | 149 | 107 | 160 | 128 | 3.4 | 2.8 |
| U | 5.0 | 115 | 109 | 115 | 118 | 2.7 | 2.4 |

It is observed from Table III that when 0.2 percent by weight or more of the polysaccharide is included in the diet, a substantial reduction in the plasma cholesterol results.

EXAMPLE IV—RATS

Weanling male and female rats of the Sprague-Dawley strain were distributed on the basis of weight to 5 groups of 10 males and 10 females each. The animals were housed individually in metal screen bottom cages and were offered water and food ad libitum. A ground commercial laboratory ration constituted the basal diet.

Crude protein (minimum)—23%
Crude fat (minimum)—4.5%
Crude fiber (maximum)—6%

Test materials were incorporated into the basal diet at the following levels:

| Diet | Carbohydrate | Percent by weight polysaccharide |
|---|---|---|
| V | Control | |
| W | Polysaccharide | 0.2 |
| X | do | 2.0 |
| Y | do | 10.0 |
| Z | Polysaccharide (whole ferment) | 10.0 |

The polysaccharide employed in Diet Z comprised a 10 percent level of whole dried ferment which contained about 50 percent polysaccharide. This whole ferment polysaccharide was prepared as in Example I through page 6, line 28, after which it was dried on a roll drier and ground to a powder.

[5] Method of Drekter—American Bulletin of The New York Medical College, 6:136 (1943).

Table IV shows plasma cholesterol[6] determined at 30 and 90 days and weight gain at 90 days.

TABLE IV

| Diet | Supplement (percent by weight) | Mean plasma cholesterol, mg./100 ml. | | | | Mean weight gain, 90 days, kg. | |
|---|---|---|---|---|---|---|---|
| | | 30 days | | 90 days | | | |
| | | Male | Female | Male | Female | Male | Female |
| V | Polysaccharide (0) | 124 | 125 | 119 | 114 | 340 | 175 |
| W | Polysaccharide (0.2) | 112 | 95 | 105 | 105 | 331 | 178 |
| X | Polysaccharide (2.0) | 95 | 131 | 93 | 117 | 320 | 175 |
| Y | Polysaccharide (10.0) | 105 | 177 | 104 | 101 | 310 | 176 |
| Z | Dried ferment (10.0) | 121 | 131 | 106 | 95 | 319 | 173 |

As indicated in Table IV, addition of polysaccharide to the diet of male rats provided a reduction in the cholesterol level over that of the control diet (i.e., Diet V). It was also observed that while weight gain of the male rats was reduced by increased consumption of the polysaccharide, they maintained excellent health.

Although the above examples were directed to specific polysaccharide, similar resutls are provided by employing various other polysaccharides as disclosed herein.

EXAMPLE V

The dry ingredients of a standard chiffon cake formulation, containing gum arabic as an additive for improved texture and keeping quality, were modified by using the polysaccharide (0.35 weight percent) as prepared per Example I of copending application, Ser. No. 319,093 filed Oct. 24, 1963, in place of the gum arabic. The standard and modified cakes were baked in the same oven and compared for quality. The cakes having the polysaccharide exhibited greater height and better keeping quality than the standard formulation containing gum arabic.

EXAMPLE VI

A standard marshmallow cake frosting formulation was modified by adding 0.4 percent by weight of polysaccharide powder, prepared in accordance with Example I of copending application, Ser. No. 319,093 filed Oct. 24, 1963. The resulting frosting gave a more attractive appearance and retained moisture to a greater extent over a 24-hour test than the standard formulation. In addition, the frosting containing the polysaccharide did not form a skin upon exposure to air, whereas the standard formulation formed a skin within several hours.

EXAMPLE VII—WHIPPED TOPPING

Ingredients: Weight percent
Hydrogenated vegetable oil _____ 24.00
Water _____ 60.80
Sugar (sucrose) _____ 9.50
Polysaccharide (Example I) _____ 0.15
Sodium caseinate _____ 4.00
Propylene glycol monostearate _____ 0.8
Glyceryl monostearate _____ 0.25
Glyceryl distearate _____ 0.20
Lecithin _____ 0.30
                                      ─────
                                      100.00

A melted fat phase was prepared from the above oil, lecithin, propylene glycol monostearate, glyceryl mono and distearate by heating the oil containing phase to 160° F. with slight agitation. An aqueous phase was then prepared by adding the remaining ingredients to the water and heating to 160° F. The heated aqueous phase was then mixed with the heated fat phase and stirred. The mixture was homogenized (first stage 1,500 p.s.i.—second stage 500 p.s.i.) and cooled to 75° F. A whipped topping was prepared from the homogenized mixture by whipping for 10 minutes in a standard household mixer operated at high speed.

Typical additional animal food products in which the polysaccharides are adaptable include: meats, sausages, sausage castings, sauces, gravies, soups, dehydrated mashed potatoes, dehydrated fruits and juices, fresh fruits, fruit concentrates, cereals, puddings, syrups, toppings, dessert jells, jellies, jams, soft drinks, wine bases, beer, chocolate milk, tea components, egg nog mix, cottage cheese, ship cream, sherbets, icings, cheeses, ice pops, yoghurt, ice cream, fruit cakes, doughnuts, batter mixes, confections, conserves, pie filling, glazes, meringues, breads, cake fillings, cookie mixes, cookies, dietetic foods, health foods, candy, caramel, taffy, coatings, beet sugar, beet sugar processing and animal feeds.

Adaptation of other polysaccharides disclosed herein can be provided in the animal food products.

What is claimed is:

1. An animal food product containing more than .05 percent by weight of a polysaccharide, said polysaccharide consisting essentially of a polymeric chain of D-glucopyranose units, said D-glucopyranose units being contiguously attached to one another by a beta 1,3 linkage to form said polymeric chain, said polymeric chain having appendant D-glucopyranose groups, said groups being contiguously attached to the polymeric chain through a beta 1,6 linkage, said polysaccharide having a molecular weight in excess of 1,000 and less than a 3:1 ratio of D-glucopyranose units without appendant D-glucopyranose groups to D-glucopyranose units having D-glucopyranose groups.

2. The animal food product according to claim 1 wherein the polysaccharide has an average molecular weight of at least 19,000, the ratio ranges from less than 3:1 to about 1:3 and the amount of polysaccharide contained in said food product ranges from about 0.05 percent by weight to about 10 percent by weight.

3. The food product according to claim 2 wherein the polysaccharide has a molecular weight of at least 50,000 and the ratio ranges from about 5:2 to about 4:3.

4. The food product according to claim 3 wherein the ratio ranges from about 2:1 to about 3:2.

5. The food product according to claim 4 wherein the polysaccharide has a molecular weight of at least 100,000 and the amount of polysaccharide contained in said food product ranges from 0.2 percent by weight to about 10 percent by weight.

6. The food product according to claim 5 wherein said product contains about 0.2 percent by weight to about 5 percent by weight of the said polysaccharide.

7. The product according to claim 6 wherein the polysaccharide has a ratio of about 2:1 and the amount of polysaccharide contained in said product ranges from about 0.5 percent by weight to about 3 percent by weight.

8. A method of inducing a reduction in the plasma cholesterol of an animal which comprises orally administering to said animal a polysaccharide in an amount and for a period of time sufficient to reduce said plasma cholesterol level, said polysaccharide consisting essentially of a polymeric chain of D-glucopyranose units, said D-glucopyranose units being contiguously attached to one another by a beta 1,3 linkage to form a polymeric chain, ---
[6] Method of Drekter—American Bulletin of the New York Medical College, 6:136 (1943).

said polymeric chain having appendant D-glucopyranose groups, said groups being contiguously attached to the polymeric chain through a beta 1,6 linkage, said polysaccharide having a molecular weight in excess of 1,000 and no greater than a 3:1 ratio of D-glucopyranose units without appendant D-glucopyranose units to D-glucopyranose units having appendant D-glucopyranose groups.

9. The method according to claim 8 wherein the polysaccharide has a molecular weight in excess of 19,000 and the ratio of D-glucopyranose groups free from D-glucopyranose units to D-glucopyranose units having appendant groups ranges from no greater than 3:1 to about 1:3.

10. The method according to claim 9 wherein the polysaccharide has an average molecular weight in excess of 50,000 and the ratio ranges from about 5:2 to about 4:3, said polysaccharide being administered in an effective amount ranging from more than incidental impurities to about 10 percent by weight of the solid food intake of said animal.

11. The method according to claim 10 wherein the polysaccharide has an average molecular weight of at least 100,000, the ratio ranges from about 2:1 to about 3:2 and the amount of polysaccharide administered to said animal ranges from at least 0.1 percent by weight to about 5 percent by weight.

12. The method according to claim 11 wherein the amount of polysaccharide administered to said animal ranges from about 0.2 percent by weight to about 3 percent by weight.

13. The method according to claim 12 wherein the polysaccharide has a ratio of about 2:1.

References Cited

UNITED STATES PATENTS 3,200,110    8/1965    Gollin et al.      167—65 X

ALBERT T. MEYERS, Primary Examiner

V. C. CLARKE, Assistant Examiner

U.S. Cl. X.R.

99—2; 260—209